United States Patent
Derouin et al.

(10) Patent No.: US 6,791,255 B1
(45) Date of Patent: Sep. 14, 2004

(54) HIGH COEFFICIENT OF THERMAL EXPANSION SPACER STRUCTURE MATERIALS

(75) Inventors: Timothy A. Derouin, Los Altos, CA (US); Sudhakar Gopalakrishnan, San Jose, CA (US)

(73) Assignees: Candescent Intellectual Property Services, Inc., Los Gatos, CA (US); Candescent Technologies Corporation, Los Gatos, CA (US)

( * ) Notice: Subject to any disclaimer, the term of this patent is extended or adjusted under 35 U.S.C. 154(b) by 0 days.

(21) Appl. No.: 10/234,745

(22) Filed: Sep. 4, 2002

(51) Int. Cl.[7] ............................. H01J 1/62; H01J 63/04
(52) U.S. Cl. ....................... 313/495; 313/496; 313/292; 313/257
(58) Field of Search ................................ 313/495–497, 313/250, 257, 258, 274, 238, 292, 422; 106/635, 692, 436, 287.17

(56) References Cited

U.S. PATENT DOCUMENTS

| | | | | |
|---|---|---|---|---|
| 5,865,930 A | * | 2/1999 | Schmid et al. | 156/265 |
| 5,916,396 A | * | 6/1999 | Schmid et al. | 156/89.16 |
| 6,157,123 A | * | 12/2000 | Schmid et al. | 313/422 |
| 6,235,261 B1 | * | 5/2001 | Khan et al. | 423/593.1 |
| 6,489,718 B1 | * | 12/2002 | Schmid et al. | 313/495 |
| 6,600,263 B1 | * | 7/2003 | Ito | 313/495 |
| 6,653,769 B1 | * | 11/2003 | Nishioka et al. | 313/292 |

* cited by examiner

*Primary Examiner*—Vip Patel
*Assistant Examiner*—Anthony Perry (57) ABSTRACT

A spacer structure for a display is disclosed that has a CTE which matches or very closely approximates the CTE of a high quality, desirable glass from which other display structures such as faceplates can be fabricated. The spacer structure is composed of a material that has a CTE that is tailorable within a range that closely matches the CTE range spanned by a variety of readily available high quality, desirable glass from which other display structures such as faceplates can be fabricated. The spacer structure disclosed has a CTE that achieves the foregoing qualities and retains all other properties characterizing requirements for use in displays. Further, the spacer structure disclosed has a CTE that enables great flexibility in the selection of other display components, without having to revamp existing fabrication techniques. Further still, a spacer structure is disclosed that minimizes zero current shift.

25 Claims, 5 Drawing Sheets

(Prior Art)

HIGH COEFFICIENT OF THERMAL EXPANSION SPACER STRUCTURE MATERIALS

TECHNICAL FIELD

The present claimed invention relates to the field of electronic displays. More specifically, the present claimed invention relates to a spacer (e.g., support) structure for an electronic display, including flat panel displays.

BACKGROUND ART

In some displays including flat panel displays, a backplate is commonly separated from a faceplate using a spacer (e.g., support) structure. In high voltage applications, for example, the backplate and the faceplate are separated by spacer structures having a height of approximately 1–3 millimeters. For purposes of the present application, high voltage refers to an anode to cathode potential greater than 1 kilovolt. Illustratively, in flat panel displays, the backplate deploys an array of cathodes (e.g., electron emitters) and the faceplate deploys an array of pixels and serves as an accelerating anode for electrons emitted by the cathode array, which travel through high vacuum between the anode and the cathode. The space between the cathode array and the anodes is sealed by fusing frit, a mixture of powdered glass and various other agents that joins the backplate and the faceplate. The space is then evacuated.

Upon evacuation, atmospheric pressure exerts a force tending to collapse the faceplate into the backplate. The spacer structures are deployed to withstand this force and thus support the faceplate. In one embodiment, the spacer structure is comprised of several strips or individual wall structures each having a width of about 50 microns. The strips are arranged in parallel horizontal rows with each strip extending across the width of the flat panel display. The spacing of the rows of strips depends upon the strength and size of the backplate and the faceplate and the strips, their surface areas, and the concomitant force of atmospheric pressure. Because of this, it is desirable that the strips be extremely strong. The spacer structure must meet a number of intense physical requirements.

In a typical flat panel display, the spacer structure must comply with a long list of characteristics and properties. More specifically, the spacer structure must be strong enough to withstand the atmospheric forces which compress the backplate and faceplate towards each other. Additionally, each of the rows of strips in the spacer structure must be essentially equal in height, so that the rows of strips accurately fit between respective rows of pixels. Furthermore, each of the rows of strips in the spacer structure must be very flat to insure that the spacer structure provides uniform support across the interior surfaces of the backplate and the faceplate.

Spacer structures must also have good stability. More specifically, the spacer structure should not degrade severely when subjected to electron bombardment, high operating temperatures, temperature variations, and/or subjection to a vacuum. As yet another requirement, a spacer structure should not significantly contribute to contamination of the vacuum environment of the flat panel display. Spacer structures therefore should not significantly out-gas in vacuo at any point within its operational temperature and voltage ranges. Further, spacer structures should not be susceptible to contamination that may evolve within the evacuated space such that any of their required properties degrade.

Another requirement for a spacer structure for a display is that it cannot interfere with the trajectories of the electron beams emitted by the display's cathode, for example a Spindt emitter array cathode, toward their target pixels on the faceplate, which functions electrically as an anode. Interfering with the electrons' trajectories can cause image distortion, degradation, or failure. For these reasons, a spacer structure must not retain any significant electrostatic charge which could deflect the electrons' trajectories by attraction or repulsion. Thus, the coefficient of emission of secondary electrons, e.g., the secondary electron coefficient of emission, must suffice such that, ideally, for every electron absorbed by the spacer structure, a numerically corresponding electron is emitted.

Special coatings may be applied to spacer structures to ensure a satisfactory secondary electron coefficient of emission. The energy of electrons impinging on different parts of the wall varies. Electrons impinging on the spacer structure near the cathode have an energy which is typically much less than the energy of electrons which strike the spacer structure near the anode. Thus, such coatings may be tailored such that the secondary electron coefficient of emission varies from one part of the spacer structure to another, e.g., the position of a part relative to the cathode and the anode. As a result of the variation in energy of impinging electrons, the secondary electron emission coefficient function of the wall will also vary significantly from the portion of the spacer structure near the cathode to the portion of the spacer structure near the anode.

Spacer structures should have a consistent and well-managed thermal coefficient of resistivity, such that its Ohmic resistance does not vary significantly with temperature, over the operating ranges of the display. In so far as the resistivity of the spacer structure does change with temperature, it is important that it varies uniformly and as little as possible. Further, spacer structures for displays should meet sheet resistance specifications. Further still, variations in wall resistance uniformity, especially in the resistance uniformity across the height of the wall, can cause a zero current shift, e.g., a variation in the electron beam along the wall due to improper electrical potential on the wall surface. Zero current shift variation causes image degradation due to visible distortion of a displayed image generated by the beam.

Excellent thermal conductivity is another important characteristic of a well-designed spacer structure. This ensures that the heat generated in the structures by the electron bombardment is transferred uniformly across the entire spacer structure. It also ensures that the temperature variation in a spacer structure is minimized significantly. Such variation could otherwise result in mechanical stresses and strains and/or structural changes, which can cause cracking, deformation, and failure. Such variation can also result in resistance changes.

Display cathodes and anodes can be somewhat intricate structures. For example, the cathode structure of a flat panel display can be an array of microscopic Spindt emitters and associated gates and other structures interconnected by a matrix of rows and columns of conductors. A corresponding anode can be an array of sub-pixels and a matrix of opaque material, such as what is sometimes called black chrome, placed proximately to the sub-pixels themselves to separate the regions between the sub-pixels. Since the support structures for such display are designed to resist the force of atmospheric pressure tending to collapse the faceplate towards the backplate, the ends of the support structures are in physical contact with the inner surfaces of both the faceplate and backplate. The support structures must therefore touch or be in close proximity to both the cathode and the anode. The support structures may or may not be buttressed in these areas, to prevent lateral movement. Buttressed or not, the support structures of such a flat panel display are mounted in focus waffles on their cathode-abutting end and in small indentations, such as in the black chrome on their anode-abutting end.

Figure 1:
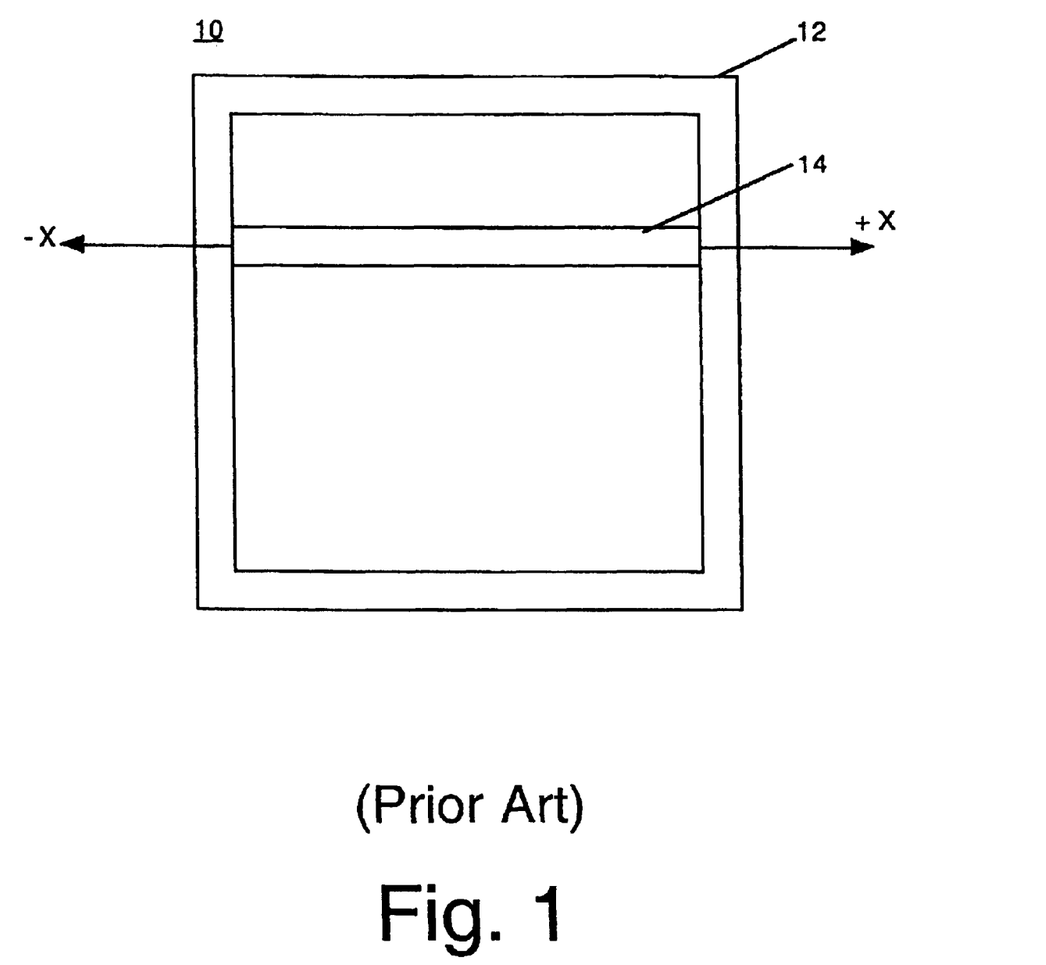
FIG. 1 is a top view of a display wherein the faceplate and a spacer structure thereof are undergoing thermal expansion.

However, during the thermal cycling associated with the operation of the display, the support structures heat up during temperature rises with concomitant physical expansion and cool off during temperature drops with concomitant physical contraction. The degree to which the dimensions of the support structures change with thermal cycling is a function of its coefficient of thermal expansion (CTE), measured in units of meters per meter-degree Celsius. With reference illustratively to Prior Art FIG. 1, an anode faceplate 12 of a flat panel display 10 is supported by a wall type support structure 14. During the operational heatup of flat panel display 10, both glass faceplate 12 and wall 14 also rise in temperature and physically expand. As wall 14 heats up, it expands isotropically (e.g., vertically as well as horizontally) in both the positive and negative directions along the dimension X, e.g., in both the positive X and negative X direction. Conventionally, spacer structure materials have been formulated to minimize CTE mismatch between support and other display components, as well as to optimize the other physical properties discussed above. However, just so minimizing the spacer structures' CTE mismatch can be problematic. It is appreciated that similar phenomena occur for cathode glass (e.g., backplates).

Where a mismatch exists between the CTE of glass faceplate 12 and the CTE of the wall 14, the wall 14 will expand at a different rate and to a different degree than faceplate 12. This can cause the wall 14 to rub and/or scrape against the materials such as black chrome and other matrix material, polyimide, and possibly pixel material of faceplate 12. Such scraping can have a number of deleterious effects on the operational performance of the display. For instance, debris can be sloughed off. This debris can contaminate the evacuated internal environment of the display, can degrade the vacuum, and can foul the cathode, which can cause scattering or absorption of emitted electrons, or otherwise interfere with their trajectories. Another effect of the scraping can be that actual pixel phosphors can be damaged, along with opaque pixel borders. In either event, the images that are to be displayed can be fouled or the operational performance of the display can otherwise be degraded.

Conventionally, these problems are addressed by determining the CTE of the material used to fabricate the spacer structures, composed to satisfy the litany of requirements described above. For example, one such material has a CTE on the order of $70-75 \times 10^{-7}$ per degree Celsius. Then an attempt is made to find glass material with a closely matching CTE for use as a faceplate and backplate (e.g., cathode glass) and a corresponding glass powder or frit for use as the sealing frame. Sometimes, exactly matching glasses are difficult to locate and glasses with CTEs approximating the CTE of the spacer structures are selected instead. Thus, another conventional technique has been to have glass custom-fabricated to match the CTE of the spacer structures. Both techniques require almost painstaking cooperation with other entities such as vendors, who are not directly involved in the fabrication of the displays. This relational reliance has proven problematic for a number of reasons.

It is appreciated that frit or sealing glass powder is usually derived from a composition different from that of the display glass. The CTE of the frit or sealing glass powder is matched both to the spacer material selected, as well as to the display glass. Commercially available frit materials are available, which approximate the CTE of display glass and spacer structures. Such frit materials typically have a high lead content.

The conventional approach of selecting glasses which approximate the CTE of the spacer structures yields varying, often sub-optimal results based on the closeness of the approximation. The conventional approach of having faceplate glasses custom-tailored to match the CTE of the spacer structures is expensive. Further, this approach is inefficient because a display fabricator becomes tied for this purpose to a very small pool of glass vendors, perhaps even a single glass supplier. The display fabricator is constrained by the availability of glass allocated by the small vendor pool, and the glass selected may not be the best material available. However, the limitations of the supplier pool may render it the sole selection, which can be sub-optimal. Glasses are readily available for applications such as displays, including flat panel displays. However, the CTE of some such glasses is on the order of $80-85 \times 10^{-7}$ per degree Celsius. Flat panel and other display glasses with CTEs in other ranges are also readily available.

In one conventional approach, glass-based ceramics have been proposed in an effort to alter thermal expansion. However, detrimental effects on strength and electrical properties of walls and other spacer structures composed therefrom limit the applicability of this approach to the fabrication of spacer structures. Alternatively, it is conceivable that a new fabrication technique for display support structures can be developed with significantly different materials. However, this would demand that the existing processes be substantially revamped, which would undoubtedly be costly and an inefficient use of presently available resources.

DISCLOSURE OF THE INVENTION

A need exists for a spacer structure for displays having a coefficient of thermal expansion (CTE) which matches or very closely approximates the CTE of a high quality, desirable glass from which other display structures such as faceplates and backplates (e.g., cathode glass) can be fabricated. A need also exists for a spacer structure for displays that is composed of a material that has a CTE that is tailorable within a range that closely matches the CTE range spanned by a variety of readily available high quality, desirable glass from which other display structures such as faceplates and backplates can be fabricated. A further need exists for a spacer structure for displays having a CTE that satisfies the foregoing while retaining all other properties characterizing requirements for use in displays. Further still, a need exists for a spacer structure, the CTE of which enables great flexibility in the selection of other display components, without having to revamp existing fabrication techniques. Yet further still, a need exists for a spacer structure that minimizes zero current shift.

A spacer structure (e.g., a support structure) for a display is disclosed that has a CTE which matches or very closely approximates the CTE of a high quality, desirable glass from which other display structures such as faceplates and backplates (e.g., cathode glass) can be fabricated. The spacer structure is composed of a material that has a CTE that is tailorable within a range that closely matches the CTE range spanned by a variety of readily available high quality, desirable glass from which other display structures such as faceplates and backplates can be fabricated. The spacer structure disclosed has a CTE that achieves the foregoing qualities and retains all other properties characterizing requirements for use in displays. Further, the spacer structure disclosed has a CTE that enables great flexibility in the selection of other display components, without having to revamp existing fabrication techniques. Further still, a spacer structure is disclosed that minimizes zero current shift.

In one embodiment, the materials from which spacer structures for displays are fabricated are combined in new formulations such that the CTE of the finished spacer structures fabricated therefrom is significantly higher than the CTE of conventional display spacer structures. In one embodiment, compounds are added to the materials from which spacer structures are fabricated such that the CTE of the finished spacer structures fabricated therefrom is significantly higher than the CTE of conventional display spacer structures. The spacer structures resulting from these embodiments meet or exceed the various other physical properties requirements for successful deployment and application under the intense electron bombardment in a high voltage field and high temperature exposure within the evacuated confines of an operational display, yet their CTE is significantly higher than that of conventional spacer structures.

In one embodiment, spacer structures are fabricated having a high CTE over a range of values from mixtures of zirconia ($ZrO_2$) and alumina ($Al_2O_3$). In another embodiment, spacer structures are fabricated having a high CTE over a range of values from mixtures of magnesia (MgO) and alumina ($Al_2O_3$). In yet another embodiment, other compounds, such as titania ($TiO_2$) and molybdenum trioxide ($MoO_3$) and/or metallic molybdenum (Mo), are added to the mixtures mentioned above.

The CTE of spacer structures produced in one embodiment is on the order of $80-85 \times 10^{-7}$ per degree Celsius, which is advantageously in the range of readily available high quality display glasses. Utilization of such spacer structures fabricated from materials having a high CTE advantageously allows the selection of a wide variety of readily accessible glasses and other materials for the fabrication of other display components such as faceplates. This flexibility accords the further advantage of lowering fabrication costs for displays and greater material availability without having to revamp existing display fabrication techniques.

In yet still another embodiment, spacer structures are fabricated using mixtures containing ammonium octamolybdate ($(NH_4)_4Mo_8O_{26}$), instead of $MoO_3$, which results in a more uniform distribution of molybdenum throughout the spacer structure. This more uniform molybdenum distribution achieves excellent resistance uniformity across the height of the wall. Advantageously, this resistance uniformity minimizes zero current shift.

These and other advantages of the present invention will no doubt become readily apparent to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION OF EMBODIMENTS OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention. Additionally, although the following discussion specifically mentions spacers, spacer structures, and spacer walls, it will be understood that the present invention is also well suited to the use with various other support structures including, but not limited to, posts, crosses, pins, wall segments, T-shaped objects, and the like. Throughout the specification of embodiments of the present invention, the terms "spacer structure" and "support structure" are used interchangeably.

The following definitions are used in the description below. Herein, the terms "electrically insulating" and "dielectric" generally apply to materials having a resistivity greater than $10^{12}$ Ohm-cm. The term "electrically non-insulating" refers to materials having a resistivity below $10^{12}$ Ohm-cm. Electrically non-insulating materials are divided into electrically conductive materials for which the resistivity is less than 1 Ohm-cm, and electrically resistive materials for which the resistivity is in the range of 1 Ohm-cm to $10^{12}$ Ohm-cm. These categories are determined at low electric fields.

Examples of electrically conductive materials (e.g., electrical conductors) include metals, metal-semiconductor compounds, and metal-semiconductor eutectics. Electrically conductive materials also include semiconductors doped (n-type or p-type) to a moderate or high level. Electrically resistive materials include intrinsic and lightly doped (n-type or p-type) semiconductors. Further examples of electrically resistive materials are cermet (ceramic with embedded metal particles) and other such metal-insulator composites. Electrically resistive materials also include conductive ceramics and filled glasses.

Spacers and similar structures of embodiments of the present invention can be utilized to separate and support the faceplate and backplate structures in a cathode ray tube (CRT) display including flat panel CRT displays. A flat panel display faceplate structure typically includes an electrically insulating faceplate with a light emitting structure located on an interior surface of the faceplate. The faceplate is typically made of a glass material, and the display is sealed for evacuation using frit, a powdered glass material with or without additives. It is appreciated that the CTE of the frit is substantially similar to the CTE of the glass being discussed. The backplate structure typically includes an electrically insulating backplate with an electron emitting structure located on an interior surface of the backplate.

Spacers and similar structures of embodiments of the present invention can also be used in other flat panel displays such as plasma displays or vacuum fluorescent displays. Further, these spacers and similar structures are not limited to use in displays, but can be used in other flat panel devices used for purposes such as optical signal processing, optical addressing in devices such as phased array radar devices, and in devices, such as copiers and printers, which scan an image to be reproduced on another medium. Additionally, the invention is applicable to flat panel devices having non-rectangular screen shapes, e.g., circular, and irregular screen shapes such as might be used in a vehicle dashboard, an aircraft control panel, instrumentation and control panels and electrical switchgear.

Herein, a flat panel display is a display in which the faceplate and backplate structures are substantially parallel, and the thickness of the display is small compared to the thickness of a conventional deflected-beam CRT display, the thickness of the display being measured in a direction substantially perpendicular to the faceplate and backplate structures. Typically, though not necessarily, the thickness of a flat panel display is less than 5 cm. Often, the thickness of a flat panel is substantially less than 5 cm (e.g., 0.5–2.5 cm).

Spacer structures of the invention can be used in flat panel displays such as those described in the following co-owned U.S. Pat. No. 5,477,105 for "Structure of Light-Emitting Device with Raised Black Matrix for Use in Optical Devices Such as Flat-Panel Cathode-Ray Tubes," by Curtin, et al., U.S. Pat. No. 5,528,103 for "Field Emitter with Focusing Ridges Situated to Sides of Gate" by Spindt et al., U.S. Pat. No. 5,462,467 for "Fabrication of Filamentary Field-Emission Device, Including Self-Aligned Gate" by Macaulay et al., U.S. Pat. No. 5,559,389 for "Electron-Emitting Devices Having Variously Constituted Electron-Emissive Elements, Including Cones or Pedestals" by Spindt et al., which are incorporated by reference herein for background material.

Spacer structures for flat panel displays and their fabrication are described in the following co-owned U.S. Pat. No. 5,865,930 for "Formation of Spacers Suitable for Use in Flat Panel Displays," U.S. Pat. No. 5,916,396 for "Formation of Spacers Suitable for Use in Flat Panel Displays," U.S. Pat. No. 5,985,067 for "Flat Panel Display Typically Having Transition Metal Oxide in Ceramic Core or/and Resistive Skin of Spacer," U.S. Pat. No. 6,157,123 for "Spacer Structures for Use in Flat Panel Displays and Methods for Forming Same," all by Schmid, et al., and in co-pending U.S. application Ser. No, 09/617,591 for "Spacer Structures for Use in Flat Panel Displays and Methods for Forming Same," by Schmid, et al., filed on Jul. 18, 2000, now allowed, the issue fee therefore paid on Jul. 9, 2002, and which is assigned to the assignee of the present invention, which are incorporated by reference herein for background material.

Figure 2:
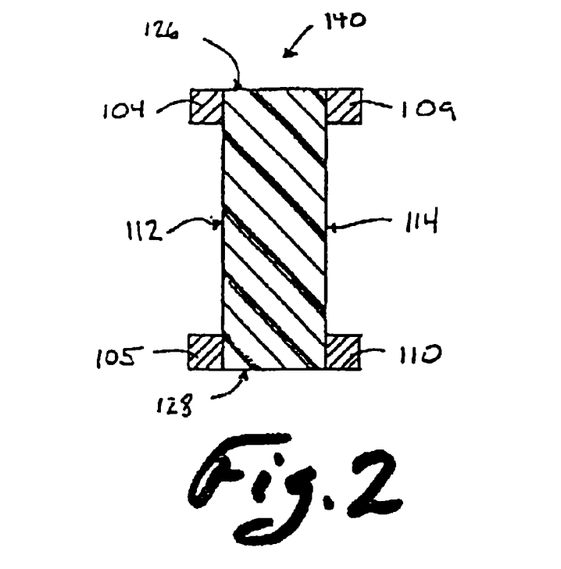
FIG. 2 is a cross sectional view of a spacer structure formed according to one embodiment of the invention.

FIG. 2 illustrates a spacer 140. Spacer 140 may have outside surfaces 112 and 114 and edge surfaces 126 and 128. Edge metallization strips may be applied to the edge surfaces of each spacer. Face metallization strips 104 and 105 may be located on outside surface 112, and face metallization strips 109 and 110 may be located on outside surface 114.

Figure 3:
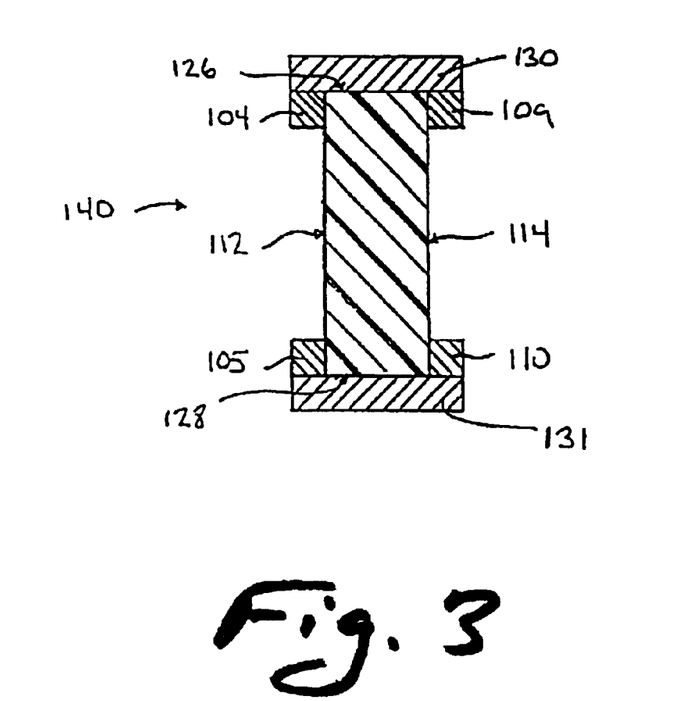
FIG. 3 is a cross sectional view of a spacer structure formed with a conductive coating, according to one embodiment of the invention.

FIG. 3 depicts spacer 140 after edge metallization strips 130 and 131 are applied to edge surfaces 126 and 128. If used, edge metallization strips 130 and 131 are applied using plasma vapor deposition (PVD) after firing of spacers, or by using conventional techniques.

Edge metallization can be placed on spacers by evaporating aluminum on the spacer edges and by screen printing silver, tungsten, or molybdenum-manganese on the spacer edges. Edge metallization can also be placed on spacers by combining silver or palladium with an organometallic material, screen coating the combination on the spacer edges, and thermally decomposing the combination at temperatures near 450° C.

After edge metallization strips 130 and 131 are formed, the resulting spacer structure can be fired in accordance with conventional techniques. Final inspection is performed to complete the fabrication of spacer 140.

Figure 4:
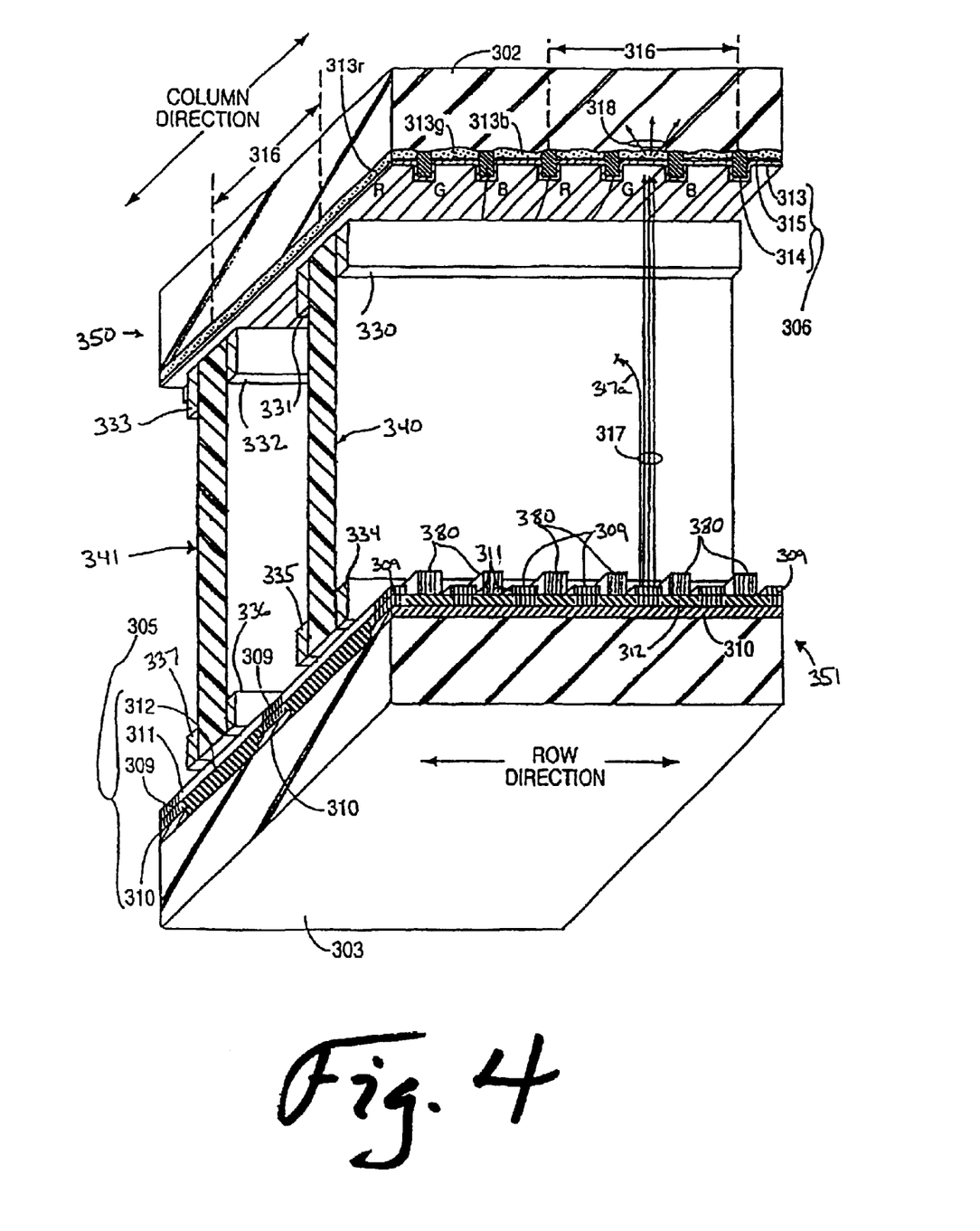
FIG. 4 is a perspective view of spacer structures positioned between a faceplate structure and a backplate structure of a flat panel display, according to one embodiment of the invention.

FIG. 4 illustrates spacers 340 and 341 positioned between faceplate structure 350 and backplate structure 351 of one embodiment of a flat panel CRT display. If used, face metallization strips 330–333 and/or edge metallization strips (not shown) adjoin faceplate structure 350, and face metallization strips 334–337 and/or edge metallization strips (not shown) adjoin backplate structure 351. Faceplate structure 350 includes faceplate 302 and light emitting structure 306. Backplate structure 351 includes backplate 303 and electron emitting structure 305. Illustratively, the internal surfaces of faceplate 302 and backplate 303 are typically 0.1–3 mm apart. Faceplate 302 is glass having, illustratively, a thickness of 1.0 mm. Backplate 303 is glass, ceramic, or silicon having, illustratively, a thickness of 1.0 mm. The center-to-center spacing of spacers 340 and 341 is, illustratively, 8 to 25 mm along dimension 316.

Electron emitting structure 305 includes electron-emissive elements (field emitters) 309, a patterned metallic emitter electrode (sometimes referred to as a base electrode) divided into a group of substantially identical straight emitter electrode lines 310, a metallic gate electrode divided into a group of substantially identical straight gate electrode lines 311, an electrically insulating layer 312 and focusing ridges 380. Other types of electron emitting structures can be used with the spacers and related structures of an embodiment of the invention. The directions of gate and emitter electrodes can be reversed.

Emitter electrode lines 310 are situated on the interior surface of backplate 303 and extend parallel to one another at a uniform spacing. Insulating layer 312 lies on emitter electrode lines 310 and on laterally adjoining portions of backplate 303. Gate electrode lines 311 are situated on insulating layer 312 and extend parallel to one another (and perpendicular to emitter electrode lines 310) at a uniform spacing.

Field emitters 309, one example of which is sometimes referred to as Spindt emitters, are distributed in an array above the interior surface of backplate 303. In particular, each group of field emitters 309 is located above the interior surface of backplate 303 in part or all of the projected area where one of gate lines 311 crosses one of emitter lines 310. Spacers 340 and 341 extend towards areas between field emitters 309 and also between emitter electrode lines 310. Spacers are typically not located between all emitter electrode lines.

Each group of field emitters 309 extends through an aperture (not shown) in insulating layer 312 to contact an underlying one of emitter electrode lines 310. The tops (or upper ends) of each group of field emitters 309 are exposed through a corresponding opening (not shown) in an overlying one of gate electrode lines 311. Field emitters 309 can have various shapes such as needle-like filaments or cones. Other types of field emitters, such as planar, edge, surface connection, metal-insulator-metal, or ballistic-type emitters may be used.

Focusing ridges 380, which extend above gate lines 311, are electrically isolated from gate lines 311. Focusing ridges may also run in both row and column directions, forming a "waffle" pattern. Focusing ridges may be raised or substantially planar. Focusing ridges 380 are described in more detail in U.S. Pat. No. 5,528,103, cited above. Spacers 340 and 341 (and face metallization strips 334–337) contact focusing ridges 380. In this case, face metallization strips 334–337 abut focusing ridges 380 and are held at the same potential as focusing ridges 380. An electrically conductive material (not shown) can also be located outside the active area of backplate structure 351 to provide an electrical connection between face metallization strips 334–337 and focusing ridges 380. This electrical connection prevents charge build-up near the ends of spacers 340 and 341 adjacent electron emitting structure 305. In alternate embodiments, spacers 340 and 341 include edge metallization strips (not shown), or edge metallization may be used without face metallization. Face metallization may be on either or both of the top or bottom of the spacers, and on either or both of the sides of the spacers. Spacers may include wall-like structures, as shown, wall segments, posts, T-shaped structures, or cross-like structures.

Light emitting structure 306 is situated between faceplate 302 and spacers 340 and 341. Light emitting structure 306 consists of a group of light emissive regions 313 (e.g., phosphor) that produce light when struck by electrons, a black matrix of substantially identical dark, non-reflective ridges 314 that do not produce light when struck by electrons, and may or may not include a light reflective layer 315. The black matrix ridges may run in both row and column directions, forming a "waffle" pattern. Black matrix ridges may be raised or substantially planar. Light emissive regions 313 are divided into a plurality of substantially identical regions 313r, 313g and 313b that emit red (R), green (G) and blue (B) light, respectively.

Light reflective layer 315 and, consequently, light emissive regions 313 are maintained at a positive voltage of 1500–10,000 Volts relative to the voltage of field emitters 309. When one group of field emitters 309 is suitably excited by appropriately adjusting the voltages of emitter electrode lines 310 and gate electrode lines 311, that group of field emitters 309 emits electrons which are accelerated towards a target light emissive region 313. FIG. 4 illustrates trajectories 317 followed by one such group of electrons. Upon reaching the target light emissive region 313, the emitted electrons cause these phosphors to emit light 318.

Some of the electrons invariably strike parts of the light-emitting structure other than the target phosphors. As illustrated by trajectory 317a, some electrons strike the spacers. The black matrix formed by dark ridges 314 compensates for off-target hits in the row direction to provide sharp contrast as well as high color purity.

Light reflective layer 315, typically aluminum, is situated on light emissive regions 313 and dark ridges 314 as shown in FIG. 4. The thickness of light reflective layer 315 is sufficiently small that nearly all of the emitted electrons that strike layer 315 pass through layer 315 with little energy loss. The surface portions of layer 315 adjoining light emissive regions 313 are quite smooth so that part of the light emitted by regions 313 is reflected by layer 315 through faceplate 302. Light reflective layer 315 also acts as the anode for the display. Because light emissive regions 313 contact layer 315, the anode voltage is impressed on regions 313. If light reflective layer is not used, the phosphor side of the faceplate glass is usually coated with a transparent conductive layer, which serves as the anode.

Spacers 340 and 341 contact light reflective layer 315 on the anode side of the display. In the embodiment wherein dark ridges 314 extend further toward backplate 303 than light emissive regions 313, spacers 340 and 341 contact portions of layer 315 along the tops (or bottoms in the orientation shown in FIG. 4) of ridges 314. The extra height of ridges 314 prevents spacers 340 and 341 from contacting and damaging light emissive regions 313. Face metallization strips 330–333 abut layer 315 and are therefore electrically connected to layer 315.

An electrically conductive material (not shown) can also be located outside the active area of faceplate structure 350—e.g., around the outer edges of faceplate structure 350—to provide an electrical connection between face metallization strips 330–333, and layer 315. For example, face metallization strips 330–333 and layer 315 can extend to the outer edges of faceplate structure 350 to be electrically connected to an electrically conductive frit. The frit is a glass composite material which bonds the outer edges of faceplate structure 350 to the flat panel display.

The electrical connections between face metallization strips 330–333 and/or edge metal (not shown) and layer 315 cause face metallization strips 330–333 to be biased at the same high voltage as layer 315. As a result, stray electrons which strike the surface of spacers 340 and 341 near face metallization strips 330–333 travel to face metallization strips 330–333. In this manner, charge build-up is prevented near the ends of spacers 340 and 341 adjacent light emitting structure 306.

High CTE Spacer Structure Materials

In one embodiment of the present invention, the materials used in the fabrication of the spacer structures include (a) mixtures of varying amounts of yttria ($Y_2O_3$)-stabilized zirconia ($ZrO_2$) and alumina ($Al_2O_3$) and (b) mixtures of varying amounts of magnesia (MgO) and alumina ($Al_2O_3$). In some formulations, other compounds including and molybdenum oxide ($MoO_3$) are added. Titania ($TiO_2$) is added to formulations herein to adjust resistivity of the spacer material. By themselves, the CTE of alumina is $8.8 \times 10^{-7}$ per degree Celsius (per deg. C.); the CTE of zirconia is $10 \times 10^{-7}$ per deg. C.; and the CTE of magnesia is $13.5 \times 10^{-7}$ per deg. C. Spacer structures with physical properties of sufficient robustness to satisfactorily perform functionally within an operation display can be fabricated with a CTE higher than that of spacers fabricated from conventional formulations.

In one embodiment, material for the fabrication of display support structures is formed by combining yttria-stabilized zirconia and alumina in different formulations, all of which having a relatively high CTE value. For formulations of the mixtures of varying amounts of yttria-stabilized zirconia and alumina to form spacer structures, the CTE of the resultant material varies directly with the ratios of alumina to zirconia, by volume. These ratios, given by percentage composition by volume of the two compounds and the resultant CTE are given in Table 1 below. The resultant CTE varies nearly linearly with this ratio.

TABLE 1

| Percent Alumina | Percent Zirconia | CTE ($\times 10^{-7}$ per deg. C.) |
| --- | --- | --- |
| 90 | 10 | 8.92 |
| 80 | 20 | 9.04 |
| 70 | 30 | 9.16 |
| 60 | 40 | 9.28 |

In one embodiment, material for the fabrication of display support structures is formed by combining alumina with magnesia in different formulations, all of which having a CTE value. For formulations of the mixtures of varying amounts of alumina and magnesia to form spacer structures, the CTE of the resultant material varies directly with the ratios of magnesia to the alumina, by volume. These ratios, given by percentage composition by volume of the two compounds and the resultant CTE are given in Table 2 below. The resultant CTE varies nearly linearly with this ratio.

TABLE 2

| Percent Alumina | Percent Magnesia | CTE ($\times 10^{-7}$ per deg. C.) |
| --- | --- | --- |
| 95 | 05 | 9.04 |
| 80 | 20 | 9.74 |

The CTE can be tailored by changing the relative composition of yttria-astabilized zirconia or magnesia to alumina. For example, a mixture of 90% alumina/10% magnesia has a CTE closer to the CTE of $9.04 \times 10^{-7}$ per deg. C. corresponding to the CTE of the 95% alumina/5% magnesia mixture than to the CTE of $9.74 \times 10^{-7}$ per deg. C. corresponding to the CTE of the 80% alumina/20% magnesia mixture. Correspondingly, a mixture of 85% alumina/15% magnesia has a CTE closer to the CTE of $9.74 \times 10^{-7}$ per deg. C. corresponding to the CTE of the 80% alumina/20% magnesia mixture than to the CTE of $9.035 \times 10-7$ per deg. C. corresponding to the CTE of the 95% alumina/5% magnesia mixture. The resultant CTEs varies nearly linearly with these ratios.

Glass whose properties and availability make it very desirable for use as faceplates in displays includes plasma display panel glass, such as PDP-200 glass, commercially available from Asahi Glass Company, Ltd. of Tokyo, Japan. Such glasses have CTEs typically on the order of $80$–$85 \times 10^{-7}$ per deg. C. In particular, PDP-200 glass has a CTE of $82$–$84 \times 10^{-7}$ per deg. C. It is appreciated that varying the ratio of zirconia in one embodiment and magnesia in another, to the alumina can effectuate the tailoring of the CTE of support structures to match or very closely approximate the CTE of the desirable glasses. Advantageously, raising the CTE of the material from which the support structures are produced effectuates selecting more desirable glass for fabrication of other display structures while retaining the robust physical properties demanded of such support structures.

New Molybdenum Source Compound for Display Spacer Structures

Spacer structures typically incorporate molybdenum or other refractory metals for uniformity of resistance, increased thermal conductivity, and other beneficial properties. In one embodiment, ammonium octamolybdate $(NH_4)_4 Mo_8O_{26}$), e.g., AOM, is added without changing the levels of currently used titania. Conventionally, molybdenum is provided by incorporating $MoO_3$ in the formulations of materials from which spacer structures are formed. In the present embodiment, AOM effectuates a distribution of molybdenum throughout the spacer structures fabricated from formulations containing it that has smaller local variations and is more spherical and uniform in shape than spacer structures prepared from conventional molybdenum or molybdenum trioxide sources. Advantageously, this produces spacer structures having greater uniformity of electrical resistance across its greatest dimension (e.g., height), which thus suffer less zero current shift than conventional structures. Also advantageously, resulting spacer structures have better high voltage robustness, improved flatness, and higher thermal conductivity, and are easier to process. In one embodiment, formulating spacer structure fabrication mixtures from AOM effectuates increasing molybdenum loading into the spacer structures above the current 8% by volume. This has the further advantage of improving the thermal conductivity of the spacer structures without any decrease in high voltage robustness, which lowers the overall thermal shift in displays formed therefrom.

Exemplary Processes

Figure 5:
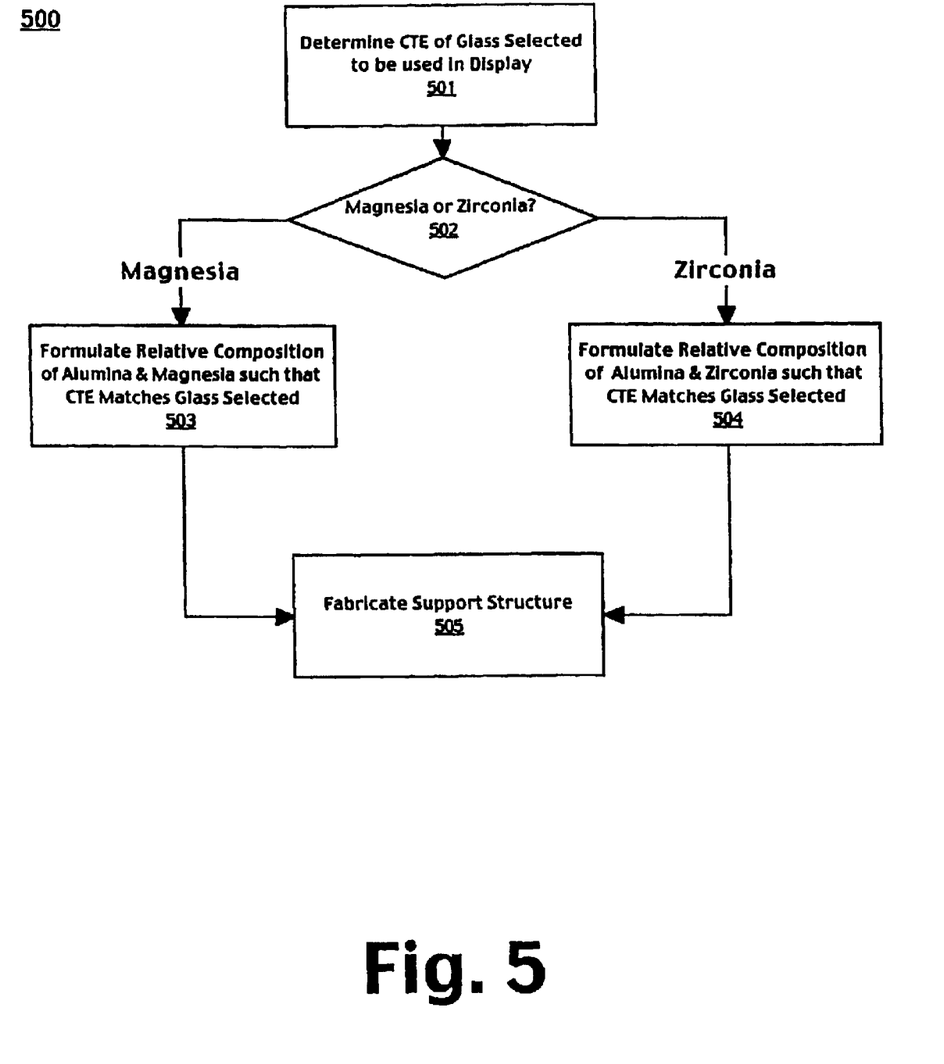
FIG. 5 is a flowchart of the steps in a method for forming a spacer structure having a tailored CTE, according to one embodiment of the invention.

In one embodiment, spacer structure products with a CTE sufficiently high to match glasses desirable for other display components (e.g., a faceplate) are produced by a process 500, as depicted in FIG. 5.

Process 500 begins with step 501, wherein the CTE of the glass selected for use in other display structures is determined. One desirable and readily available glass that can be selected, for example, is PDP-200, which has a CTE that is high relative to conventional spacer structure materials.

In step 502, it is determined whether magnesia or yttria-stabilized zirconia will be mixed with alumina (and possibly other additives) to formulate a mixture from which support structures will be fabricated.

If it is determined that magnesia is to be mixed with alumina, then in step 503, the relative composition of alumina to magnesia is formulated such that the CTE of the spacer structures formed therefrom will closely match the CTE of the glass selected. The admixture so formed can have a ratio of magnesia to alumina with a resultant CTE conforming to Table 2, above, or to a CTE interpolated or otherwise calculated therefrom.

If it is determined that zirconia is to be mixed with alumina, then in step 504, the relative composition of alumina to zirconia is formulated such that the CTE of the spacer structures formed therefrom will closely match the CTE of the glass selected. The admixture so formed can have a ratio of zirconia to alumina with a resultant CTE conforming to Table 1, above, or to a CTE interpolated or otherwise calculated therefrom.

In step 505, a support structure is fabricated by further techniques known in the art from the mixture formed in either steps 503 or 504, thus completing process 500.

Figure 6:
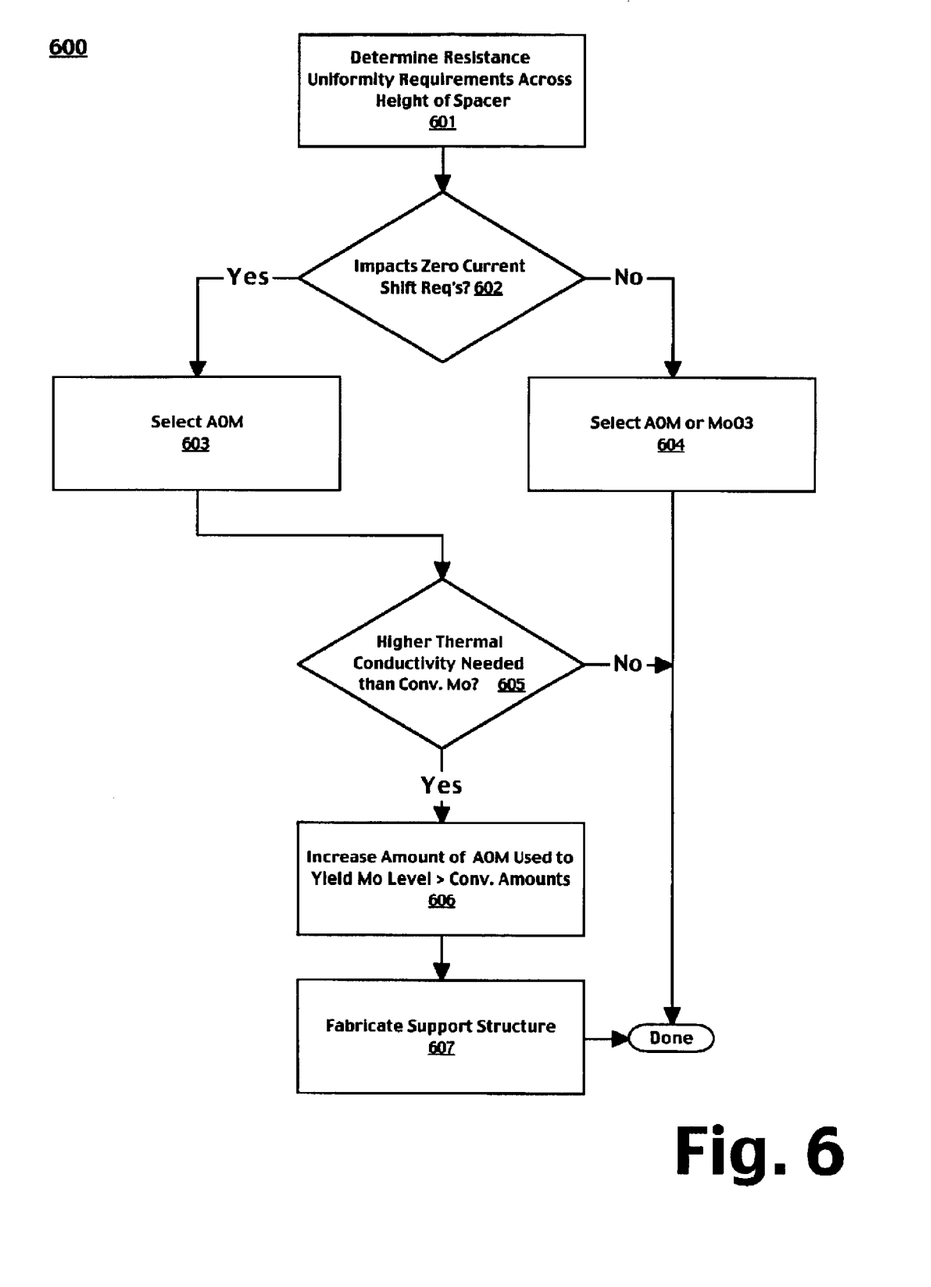
FIG. 6 is a flowchart of the steps in a method for forming a spacer structure having a small zero current shift, according to one embodiment of the invention.

In one embodiment, spacer structure products with a highly uniform resistance to minimize zero current shift are produced by a process 600, as depicted in FIG. 6. Process 600 begins with step 601, wherein the requirements for uniformity of resistance of the spacer structures to be fabricated are determined across its greatest dimension (e.g., height).

In step 602, it is determined whether the uniformity of resistance for the spacer structures to be fabricated will impact zero current shift requirements.

If it is determined that the uniformity of resistance for the spacer structures to be fabricated will impact zero current shift requirements, then in step 603, ammonium octamolybdate $(NH_4)_4Mo_8O_{26}$), e.g., AOM is selected as the source of molybdenum for the spacer structure material.

If it is determined that the uniformity of resistance for the spacer structures to be fabricated will not impact zero current shift requirements more than usual, then either AOM or $MoO_3$ can be selected as the molybdenum source, and process 600 may be complete at this point.

If AOM is selected as the source of molybdenum for the spacer structures' material, then it is determined in step 605 whether a higher thermal conductivity is needed in the spacer structures than will be accorded by conventional molybdenum concentrations. If not, process 600 may be complete at this point.

If however a higher thermal conductivity is needed in the spacer structures than will be accorded by eight percent molybdenum, then in step 606, the amount of AOM used to provide molybdenum to the spacer structures is increased as needed to yield molybdenum levels above those rendered conventionally.

In step 607, a support structure is fabricated by further techniques known in the art, thus completing process 600.

Thus, a spacer structure is disclosed that matches or very closely approximates the CTE of high quality, desirable glass from which other display structures such as faceplates and backplates (e.g., cathodes) can be fabricated. The spacer structure is composed of a material that has a CTE that is tailorable within a range that closely matches the CTE range spanned by a variety of readily available high quality, desirable glass from which other display structures such as faceplates and backplates can be fabricated. The spacer structure disclosed has a CTE that achieves the foregoing qualities and retains all other properties characterizing requirements for use in displays. Further, the spacer structure disclosed has a CTE that enables great flexibility in the selection of other display components, without having to revamp existing fabrication techniques. Further still, a spacer structure is disclosed that minimizes zero current shift.

The foregoing descriptions of specific embodiments of the present invention have been presented for purposes of illustration and description. They are not intended to be exhaustive or to limit the invention to the precise forms disclosed, and modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a display device, a spacer structure comprising:
   a surface;
   a first end contacting an inner face of an outside surface of said display device, said inner face having pixels arrayed thereon;
   a second end contacting an inside surface of said display device, said inside surface having cathodes arrayed thereon; and
   a material composition having a corresponding coefficient of thermal expansion wherein said coefficient of thermal expansion can be selected by tailoring said material composition and wherein a molybdenum component thereof is provided by ammonium octamolybdate.

2. The spacer structure as recited in claim 1 wherein said spacer structure is selected from the group consisting essentially of walls, wall segments, posts, crosses, pins, and T-shaped objects.

3. The spacer structure as recited in claim 1 wherein said surface comprises a face and an edge and wherein metallization strips are applied to said surface.

4. The spacer structure as recited in claim 1 wherein said material composition comprises a mixture of compounds selected from the group consisting essentially of alumina, zirconia, yttria-stabilized zirconia, magnesia, and titania.

5. The spacer structure as recited in claim 1 wherein said material composition comprises a mixture of compounds selected from the group consisting essentially of alumina and zirconia.

6. The spacer structure as recited in claim 5 wherein said tailoring comprises varying the relative composition of said alumina and zirconia.

7. The spacer structure as recited in claim 1 wherein said material composition comprises a mixture of compounds selected from the group consisting essentially of alumina and magnesia.

8. The spacer structure as recited in claim 7 wherein said tailoring comprises varying the relative composition of said alumina and magnesia.

9. The spacer structure as recited in claim 1 wherein said coefficient of thermal expansion is in the range of $80-85 \times 10^{-7}$ per degree Celsius.

10. The spacer structure as recited in claim 1 wherein said display device comprises a flat panel display.

11. In a display device, a spacer structure comprising:
    a surface;
    a first end contacting an inner face of an outside surface of said display device, said inner face having pixels arrayed thereon;
    a second end contacting an inside surface of said display device, said inside surface having cathodes arrayed thereon; and
    a material composition having a corresponding uniformity of resistance relative to the longest dimension of said spacer structure and the height of said spacer structure, wherein said uniformity of resistance can be optimized by tailoring said material composition and wherein a molybdenum component thereof is provided by ammonium octamolybdate.

12. The spacer structure as recited in claim 11 wherein said spacer structure is selected from the group consisting essentially of walls, wall segments, posts, crosses, pins, and T-shaped objects.

13. The spacer structure as recited in claim 11 wherein said surface comprises a face and an edge and wherein metallization strips are applied to said surface.

14. The spacer structure as recited in claim 11 wherein said material composition comprises a mixture of compounds selected from the group consisting essentially of alumina, zirconia, yttria-stabilized zirconia, magnesia, titania, and ammonium octamolybdate.

15. The spacer structure as recited in claim 11 wherein said display device comprises a flat panel display.

16. A spacer structure product for a display wherein said spacer structure product is made by the method comprising:
    determining the coefficient of thermal expansion of a glass selected for use in said display;
    formulating the relative composition of compounds comprising said spacer structure wherein said coefficient of thermal expansion of said spacer structure product matches said coefficient of thermal expansion of said glass and wherein a molybdenum component thereof is provided by ammonium octamolybdate; and fabricating said spacer structure.

17. The spacer structure product as recited in claim 16 wherein said compounds are selected from the group consisting essentially of alumina, zirconia, yttria-stabilized zirconia, magnesia, and titania.

18. The spacer structure product as recited in claim 16 wherein said compounds are selected from the group consisting essentially of alumina and zirconia.

19. The spacer structure product as recited in claim 18 wherein said formulating comprises varying the relative composition of said alumina and zirconia.

20. The spacer structure product as recited in claim 16 wherein said material compounds are selected from the group consisting essentially of alumina and magnesia.

21. The spacer structure product as recited in claim 20 wherein said formulating comprises varying the relative composition of said alumina and magnesia.

22. The spacer structure product as recited in claim 16 wherein said coefficient of thermal expansion is in the range of $80–85 \times 10^{-7}$ per degree Celsius.

23. The spacer structure product as recited in claim 16 wherein said display device comprises a flat panel display.

24. A spacer structure product for a display device wherein said spacer structure product is made by a method comprising:

determining a requirement for resistance uniformity across the longest dimension and the height of said spacer structure product;

formulating a composition for said spacer structure wherein a molybdenum component is provided by ammonium octamolybdate; and fabricating said spacer structure.

25. The spacer structure product as recited in claim 24 wherein said display device comprises a flat panel display.

* * * * *